United States Patent

Kamaguchi et al.

[11] Patent Number: 5,539,425
[45] Date of Patent: Jul. 23, 1996

[54] DISPLAY UNIT

[75] Inventors: Yutaka Kamaguchi; Seiichi Nishiyama; Hisao Sakurai, all of Kanagawa, Japan

[73] Assignee: Sony Corporation, Tokyo, Japan

[21] Appl. No.: 182,540

[22] Filed: Jan. 14, 1994

Related U.S. Application Data

[63] Continuation of Ser. No. 904,091, Jun. 25, 1992, abandoned.

[30] Foreign Application Priority Data

Jun. 27, 1991 [JP] Japan .................................. 3-183566

[51] Int. Cl.$^6$ .................................................. G09G 3/30
[52] U.S. Cl. ............................. 345/77; 348/691; 348/677
[58] Field of Search .................................. 348/173, 805, 348/556, 28, 673, 687, 691, 677, 695, 675; 345/63, 147, 77

[56] References Cited

U.S. PATENT DOCUMENTS

| | | | |
|---|---|---|---|
| 3,309,462 | 3/1967 | Loughlin | 348/691 |
| 3,845,326 | 10/1974 | Godden | 348/677 |
| 4,091,419 | 5/1978 | Rhee et al. | 348/673 |
| 4,202,009 | 5/1980 | Ushiyama et al. | 348/675 |
| 4,277,798 | 7/1981 | Hinn | 358/33 |
| 4,328,514 | 5/1982 | Nakashima et al. | 358/33 |
| 4,369,466 | 1/1983 | Mastuzaki et al. | |
| 4,551,761 | 11/1985 | Sase et al. | 348/691 |
| 4,553,169 | 11/1985 | Yoshioka et al. | 348/691 |
| 4,670,784 | 6/1987 | Goldberg | 348/173 |
| 4,990,902 | 2/1991 | Zenda | 345/63 |
| 5,008,749 | 4/1991 | Ruckert et al. | |
| 5,012,340 | 4/1991 | Kirschenstein | |
| 5,018,012 | 5/1991 | Tsuji | 348/695 |
| 5,057,920 | 10/1991 | Wilkinson | 358/170 |
| 5,146,331 | 9/1992 | Tshchida | 348/556 |
| 5,223,936 | 6/1993 | Van der Voort et al. | 348/805 |

*Primary Examiner*—Ulysses Weldon
*Assistant Examiner*—Amare Mengistu
*Attorney, Agent, or Firm*—Hill, Steadman & Simpson

[57] ABSTRACT

A display unit in which a black level is set to a predetermined level in a first display screen having a first aspect ratio and a black level is set to a predetermined level in a second display screen having a second aspect ratio is provided. A darkest signal of a video signal is detected from an image area corresponding to the second display screen. The darkest signal is lowered to a predetermined level in an image area corresponding to the first display screen. In accordance with the principles of the present invention, the situation where a video signal of the second display screen that is to be lowered will not be lowered can be prevented.

8 Claims, 4 Drawing Sheets

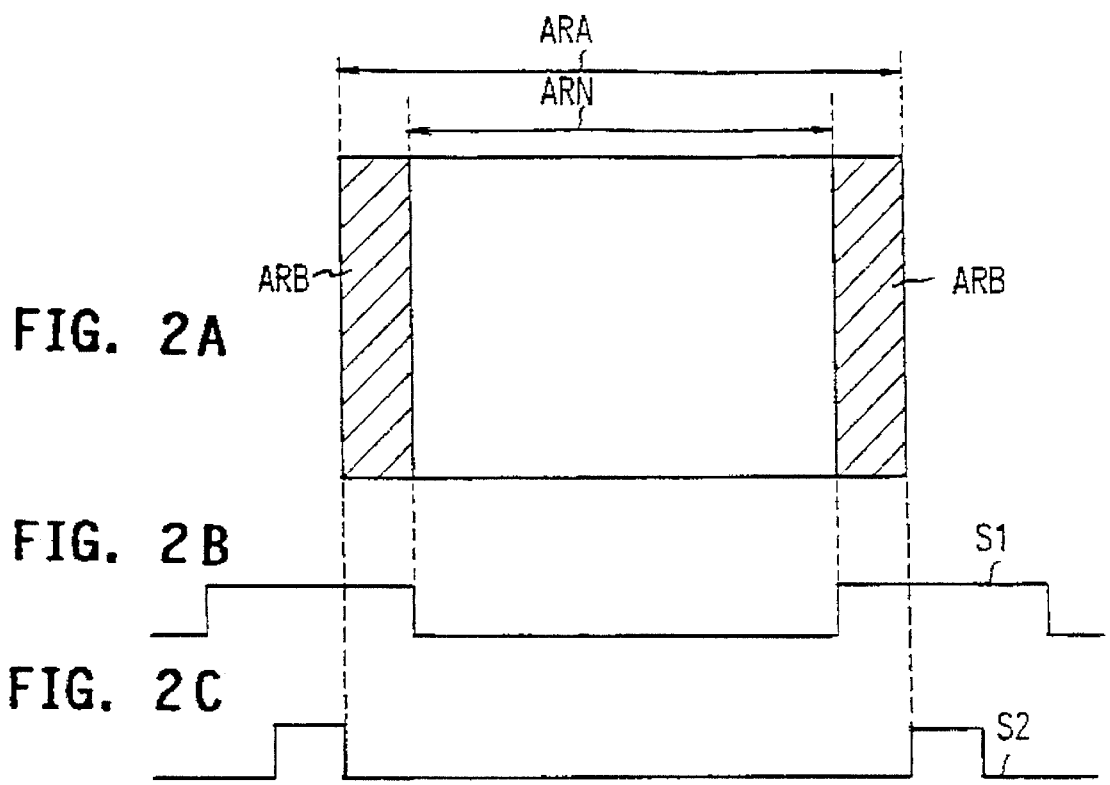
FIG. 2A
FIG. 2B
FIG. 2C
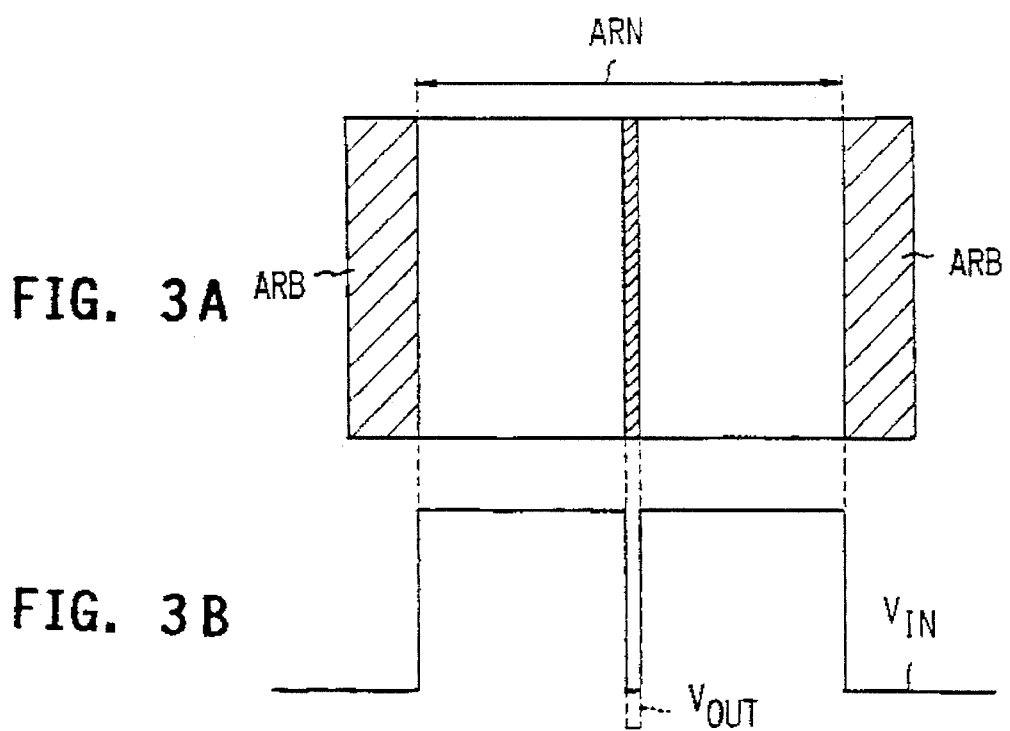
FIG. 3A
FIG. 3B

DISPLAY UNIT

This is a continuation of application Ser. No. 07/904,091 filed Jun. 25, 1992, now abandoned.

BACKGROUND OF THE INVENTION

The present invention relates to a display unit, and is preferable particularly for use on a display unit capable of displaying image screens having a different aspect ratio each on the same screen.

In a television receiver for NTSC system comprising a screen aspect ratio at 4 to 3, in case, for example, a slight black signal is included in an image high in a mean brightness level like a boundary of a bright background and hair, a black portion of the hair is seen to be afloat visually, and hence proposed hitherto is a black signal correction system for enhancing the black portion of the picture by lowering a level of the black signal.

The black signal correction system comprises detecting the darkest signal level in a video signal, lowering the black signal level to a pedestal level to a thicker visibility.

Meanwhile, it is conceivable that such black signal correction system applied not only to the conventional television receiver but also to a high vision receiver for correcting video signals which may ensure images improved still further.

SUMMARY OF THE INVENTION

In view of the foregoing, an object of this invention is to provide to a display unit for use in a television receiver, which is capable of displaying two video signals that are different in display area on the same screen, the display unit being capable of ensuring an image with a quality that is further improved by correcting a black level of the video signal.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2C are a schematic depiction of a wide aspect display and signal waveform diagrams serving for illustration of a black level detection signal and a blanking pulse signal;

FIGS. 3A and 3B are a schematic depiction of a wide aspect display and a signal waveform diagram serving for illustration of an operation when a video signal that is high in average brightness level is inputted;

DETAILED DESCRIPTION OF THE INVENTION

Figure 1:
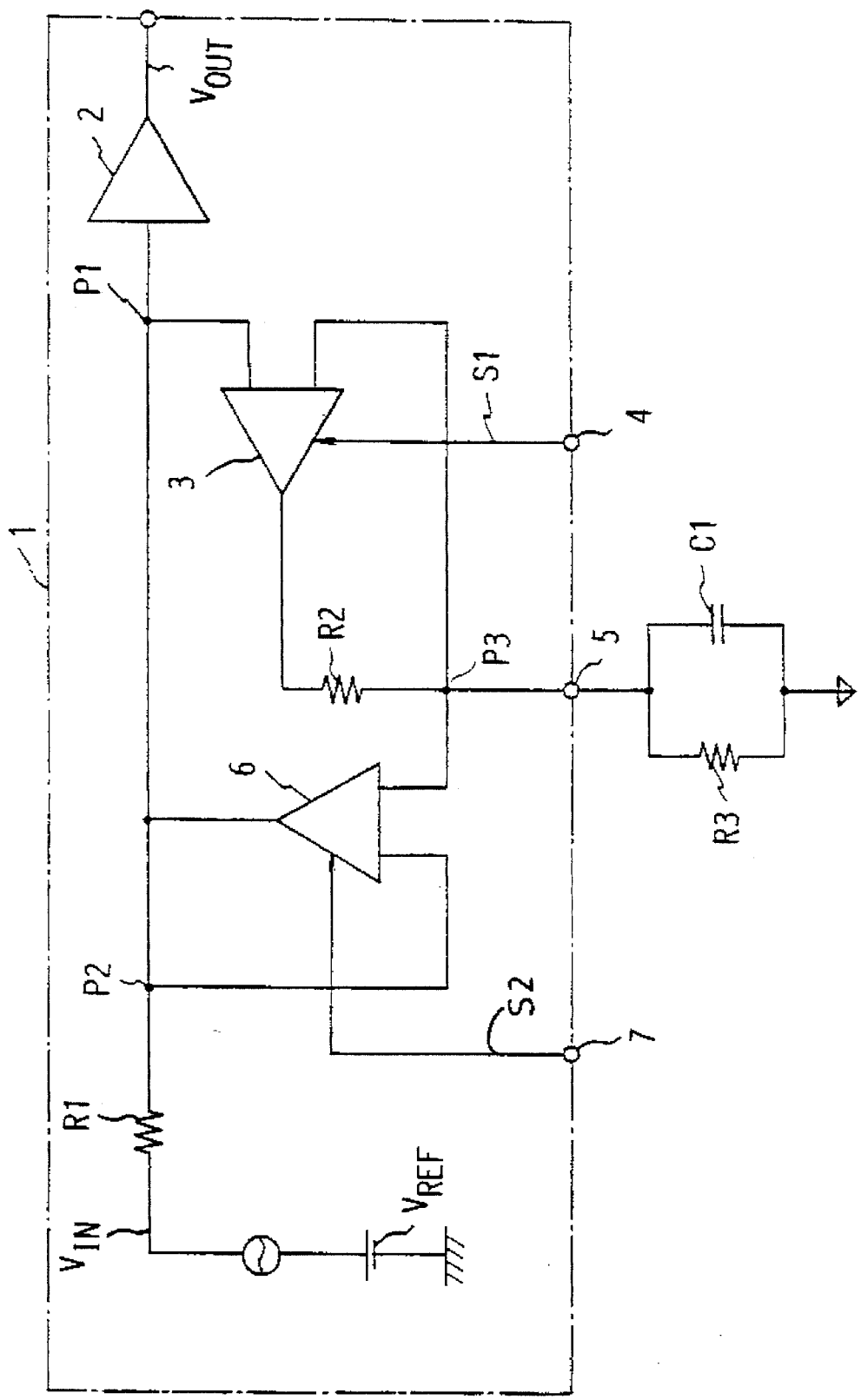
FIG. 1 is a circuit connection diagram representing a display unit of one embodiment of the present invention.

In order to solve the such problem described above, in a display unit as shown schematically in FIG. 2a for displaying, in a first display screen ARA having a first aspect ratio at 16 to 9, a second display screen ARN having a second aspect ratio at 4 to 3 with a vertical screen length substantially the same as a length of the first display screen, and a horizontal screen length shorter than the first display screen length, displaying an image of a black level in an extra area ARB of the second display screen ARN, a first aspect of the invention comprises signal level expansion means 6 as shown in FIG. 1 for lowering the darkest signal level in the image overall of the display screen to a predetermined level, when the image is displayed in the first display screen ARA.

Further, in the display unit for displaying, in the first display screen ARA having a first aspect ratio at 16 to 9, the second display screen ARN having a second aspect ratio at 4 to 3 with a vertical screen length substantially the same as a length of the first display screen, and a horizontal screen length shorter than the first display screen length, displaying an image of a black level in the extra area ARB of the second display screen ARN, a second aspect of the invention comprises signal level detection means 3 for detecting the darkest signal level in the image only in the second display screen ARN excepting the black-framed screen ARB, when the image is displayed in the second display screen ARN, and signal level expansion means 6 for lowering the signal level to a predetermined level according to a detected result of the signal level detection means 3.

According to the first aspect of the invention, when an image is displayed in the first display screen ARA, the signal level expansion means 6 lowers a black signal of the image displayed in the first display screen ARA from a black level to outputting, therefore in case images of a signal level are inputted to the second display screen ARN and the extra area ARB, a probability of a boundary of the areas being sensed visually can effectively be avoided.

According further to the second aspect of the invention, when an image is displayed in the second display screen ARN of the first display screen ARA, a black signal of a video signal $V_{IN}$ is detected by the signal level detection means 3 only in the second display screen ARN, the detected black signal is lowered from the black level by the signal level expansion means 6, thereby avoiding effectively a probability that the darkest signal level in the second display screen ARN will not be lowered to a predetermined level due to the signal level detection means 6 having detected erroneously the image of the extra area ARB as the darkest.

Preferred embodiments of this invention will be described with reference to the accompanying drawings.

In FIG. 1, a reference numeral 1 indicates a black level correction circuit as a whole, wherein an input video signal $V_{IN}$ superposed on a predetermined reference voltage $V_{REF}$ is outputted through a resistance R1 and an amplification circuit 2 in operational amplifier construction.

The input video signal $V_{IN}$ is supplied to a black level detection circuit 3 in operational amplifier construction which is connected to a connection node P1 whereat the resistance R1 and the amplification circuit 2 are connected.

The black level detection circuit 3 detects to hold the darkest signal level of the input video signal $V_{IN}$, when a black level detection signal S1 inputted from a black detection pulse input terminal 4 is low, and stops detection of the darkest signal level of the input video signal $V_{IN}$, when the black level detection signal S1 is high.

An arrangement is such that the black level detection signal S1 is low in the display area ARN (hereinafter referred to as NTSC image display area) as shown in FIG. 2A on which an NTSC image signal indicated by an aspect ratio at 4 to 3 against the display area ARA (so-called wide screen) of a high vision video signal indicated by an aspect ratio at 16 to 9, and is high in the black-framed areas ARB on opposite ends of the screen (FIG. 2B).

The black-framed area ARB is an area coming outside of the NTSC image display area ARN, and the video signal $V_{IN}$ in the black-framed area ARB has a signal level substantially of the black level.

In this case the black level hold circuit 3 is capable of holding the signal level darkest in the NTSC image display area ARN, signals substantially of the black level in the left and right black-framed areas ARB are detected, thus avoiding a probability of the signal portion darkest in the NTSC image display area ARN not being detected.

An output stage of the black level hold circuit 3 is fed back to an input stage through a resistance R2, and also connected to an external resistance R3 and a capacitor C1 connected in parallel through a pin 5, and thus a predetermined supply voltage is fed thereto.

An arrangement is such that by making a resistance value and a capacitance of the resistance R3 and the capacitor C1 variable, the black level correction circuit 1 may change a time constant and set a pulse width of the darkest signal that can be detected by the black level hold circuit 3 from the input video signal $V_{IN}$.

The black level expansion circuit 6 comprises an operational amplifier, loads the input video signal $V_{IN}$ into an input stage from a node P2 whereat the resistance R1 and the amplification circuit 2 are connected, and also loads a voltage at a node P3 whereat the black level hold circuit 3 and the pin 5 are connected into the input stage.

While a blanking pulse signal S2 inputted from a blanking pulse input terminal 7 falls, that is, other than a blanking duration, the black level expansion circuit 6 lowers the detected black signal level to a pedestal level (FIG. 2C).

The blanking pulse signal S2 is made to fall covering the whole screen display period.

Thus, when an average brightness level in the NTSC image display area ARN is high and the screen is bright, a signal level of the detected darkest video signal $V_{IN}$ can be lowered to a pedestal level, and even in case the black signal portion is slight, a probability that the black signal portion is seen afloat can be avoided effectively.

Further, a brightness level of the input video signal $V_{IN}$ can be lowered covering the display screen overall, and in case the darkest signal levels in the NTSC image display area ARN and the black-framed area ARB are even, a boundary of the display areas ARA and ARB will not be so sensed.

In the aforementioned construction, when a video signal $V_{INN}$ of the NTSC system is inputted instead of the video signal $V_{INH}$ of a so-called high vision system, the black level hold circuit 3 detects the darkest signal level in the display area ARN according to a black level detection signal S1 falling correspondingly to a period of the NTSC image display area ARN.

When an average brightness level of the video signal $V_{INN}$ is high there is less of the black signal, the black level hold circuit 3 does not hold the black signal portion since the darkest signal black level as an area of the black signal in the NTSC image display area ARN (indicated by oblique lines in the NTSC image display area ARN of FIG. 3A) is less than the area of the video signal $V_{IN}$, the circuit holds a white level signal as the black level.

In this case the black level expansion circuit 6 expands a black signal portion only of the video signal $V_{IN}$ according to the NTSC system for the blanking pulse signal S2 having fallen, thus correcting the video signal $V_{IN}$ to be seen darker than usual.

Then, as in the case of a conventional television receiver for the NTSC system, when operating the black level detection period and the black level expansion period covering the overall display screen area ARA, the black-framed areas ARB on opposite ends of the display area ARA are determined erroneously to be a black level, and thus a probability is that the black signal portion to be expanded essentially will not be expanded.

Thus, from adjusting the black level detection signal S1 so that the black level detection signal S1 does not operate in the black-framed area ARB but operates only in the NTSC image display area ARN, the black level correction circuit 1 is capable of intensifying further a black signal portion of the NTSC system video signal $V_{IN}$, when the NTSC system image is displayed on a so-called high vision video signal coordinating television receiver.

Figure 4A:
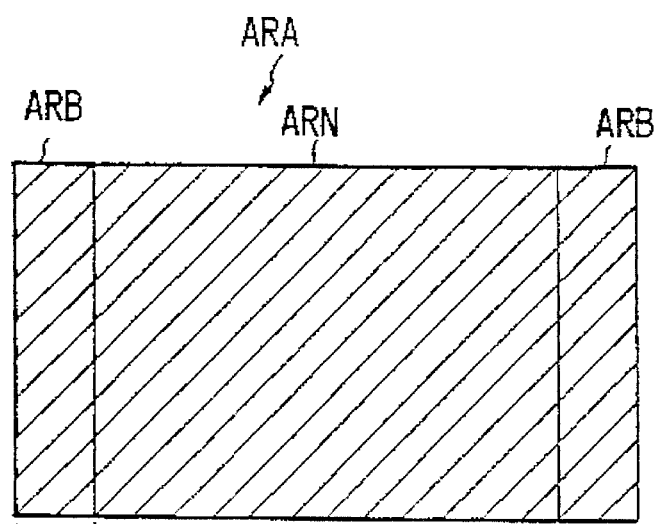
FIGS. 4A to 4C are a schematic depiction of a wide aspect display and signal waveform diagrams serving for illustration of an operation when a video signal having a uniform signal level is inputted to a whole image display area.

As shown in FIG. 4A, on the other hand, in case black levels of the video signals $V_{IN}$ inputted correspondingly to the black-framed area ARB and the NTSC image display area ARN are the same, the black level hold circuit 3 operates in the NTSC image display area ARN.

In this case, since the blanking pulse signal S2 is low covering the overall image display area ARA, the black level expansion circuit 6 expands the black signal in the whole image display area ARA including the black-framed area ARB and outputs it from the amplification circuit 2.

Figure 4B:
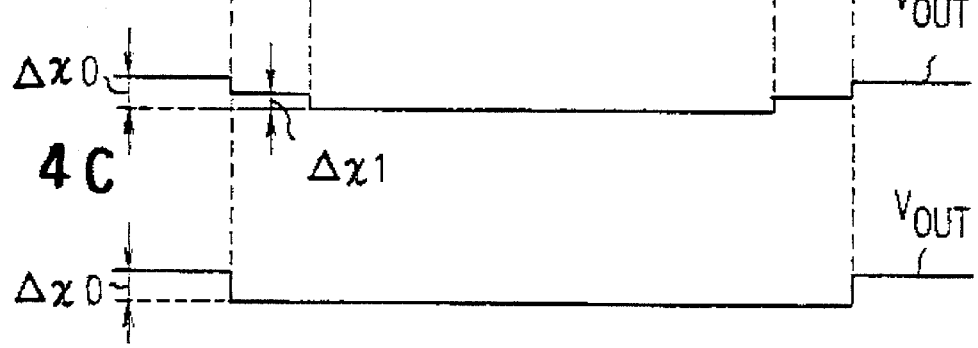
Figure 4C:

A voltage level of an output video signal $V_{OUT}$ becomes to lower by $\Delta \times 0$ (mV) from the black reference level, and a general brightness level of the whole image display area ARA seems to be somewhat low, thereby removing a visual difference in level at a boundary portion of the black-framed area ARB and the image area ARN according to the NTSC system (FIG. 4C).

Meanwhile, when the black level detection signal S1 and the blanking pulse signal S2 are adjusted to fall in the NTSC image display area ARN, the black level expansion circuit 6 operates not to the whole image display area ARA but to the image display area ARN only, therefore a difference in level at $\Delta \times 1$ (mV) will be sensed visually at a boundary portion of the black-framed area ARB and the image display area ARN according to an offset of the number (mV) to accrue to the black level hold circuit 3 and an offset of the number (mV) to accrue to the black level expansion circuit 6 (FIG. 4B).

Thus, from adjusting the blanking pulse signal S2 to fall so that the black level expansion circuit 6 does not operate in the NTSC image display area ARN central of the screen but operates in the whole image display area ARN according to the NTSC system, when an image of the NTSC system is displayed on a high vision video signal coordinating television receiver, the black level correction circuit 1 is capable of displaying the image in such manner as will not sense visually a boundary portion of the black-framed area ARB and the image display area ARA according to the NTSC system.

According to the above-described construction, when displaying video signals of the NTSC which is different in aspect ratio on the same screen of a television receiver corresponding to high vision video signals, from detecting a black level of the video signal $V_{IN}$ in the display area ARN corresponding to the video signal of the NTSC system, and expanding the black level within the whole image display area ARA, the black level of the video signal $V_{IN}$ can be detected and expanded in the image area ARN for displaying the image according to the NTSC system, and thus the probability that the black-framed area ARB is detected erroneously as a black level is effectively avoided and the black level of the image area ARN according to the NTSC system is not expanded.

Further, when displaying images in the whole image display area ARA, from expanding the black level covering the whole image display area ARA, a capability of a boundary portion of the black-framed areas ARB on opposite ends of the image area ARA and the NTSC image display area ARN being sensed visually can be avoided effectively.

The above description given for the embodiment has referred to the case where video signals according to the NTSC system which are different in aspect ratio are displayed on a so-called high vision video signal coordinating television receiver, however, the present invention is not necessarily limited thereto, and hence is applicable to a case where video signals which different in aspect ratio from the vision system such as PAL system or the like are displayed.

Further, the above-described embodiment is a exemplified by the case where the black-framed areas ARB are displayed on opposite sides of the NTSC image area ARN, however, the present invention is not necessarily limited thereto, and thus is applicable to a case where the black-framed area ARB is displayed on one side only.

Still further, the above embodiment is exemplified by the case where the darkest signal in the image area ARN is lowered to a pedestal level, however, the present invention is not necessarily limited thereto, and hence it may be lowered to a predetermined level.

Next, another preferred embodiment will be described.

An example where the present invention is applied not to a high vision television system but to a conventional television system will be described. When a cinema size picture which is enhanced in its reality and impression because of its width, is displayed on a conventional television system, it will be a familiar picture as illustrated in FIG. 5.

Figures 5A, 5B, 5C:
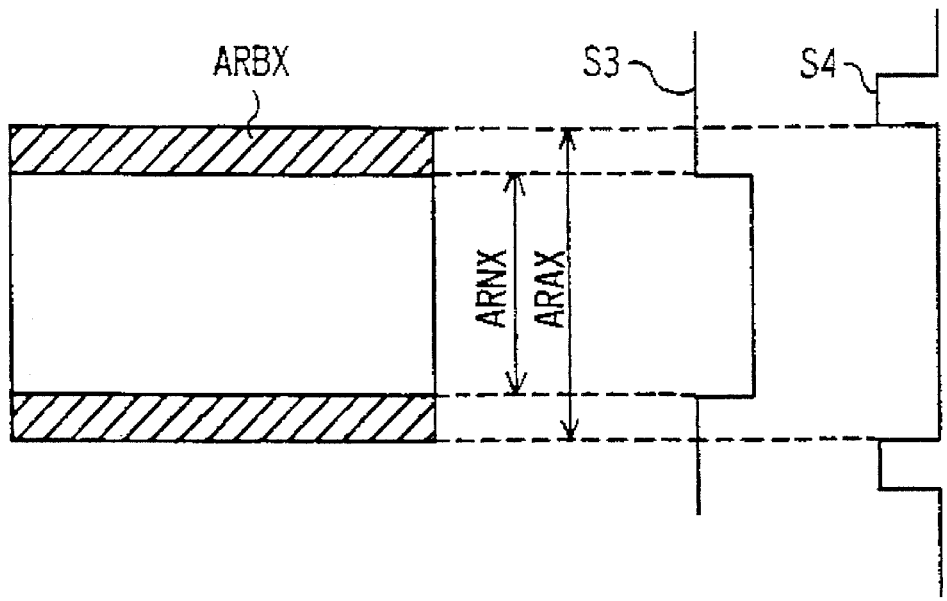
FIGS. 5A to 5C are a schematic depiction of a conventional aspect display showing a cinema format image and signal waveform diagrams serving for illustration the black level detection signal and the blanking pulse signal in a second embodiment of the present invention.

The dynamic picture function can also be applied to this picture by forming a black level detection signal S3 (FIG. 5B) and a blanking pulse signal S4 (FIG. 5C).

The operation will be described in detail.

When the block level detection signal S3 inputted from the black detection pulse input terminal 4 falls, the black level hold circuit 3 detects and holds the darkest signal level in input video signal $V_{IN}$. When the black level detection signal S3 rises, the black level hold circuit 3 stops detecting the darkest signal level in the input video signal $V_{IN}$.

The black level detection signal S3 lowers in the area ARN where the signal is displayed in cinema size (hereinafter referred to as cinema size area) which is within the area ARAX where the NTSC video signal is displayed (hereinafter referred to as NTSC picture display area), whereas it rises at the black margin area ARB at the border of the screen (FIG. 5B).

The black level hold circuit 3 holds the darkest signal level within the cinema size area ARNX, thereby preventing the near black signal in the top and bottom black margin area ARBX instead of the darkest signal in the cinema size area ARNX from being detected.

The black level correction circuit 1, by varying the resistance of resistor R3 and the capacitance of capacitor C1, changes the time constant and sets the pulse width of the darkest signal that the black level hold circuit 3 can detect from the input video signal $V_{IN}$.

The black level expansion circuit 6, while the blanking pulse S4 inputted from the blanking pulse input terminal 7 lowers, i.e. while it is outside the blanking period, lowers the detected black signal level to the pedestal level.

Here, the blanking pulse signal S4 lowers through out the entire screen display period.

Therefore, when the average brightness level in the cinema size area ARNX is high such that the display is bright, the circuit lowers the darkest detected video signal $V_{IN}$ to the pedestal level, thereby preventing the black signal portion from seemingly floating even when the black signal portion is small.

Also because of this, the brightness level of the input video signal throughout the display screen can be lowered, thereby preventing the border between the cinema size area ARNX and the black margin area ARBX from being noticeable when the darkest signal level in the cinema size area ARNX and the black margin area ARBX are equal.

Figures 6A, 6B:
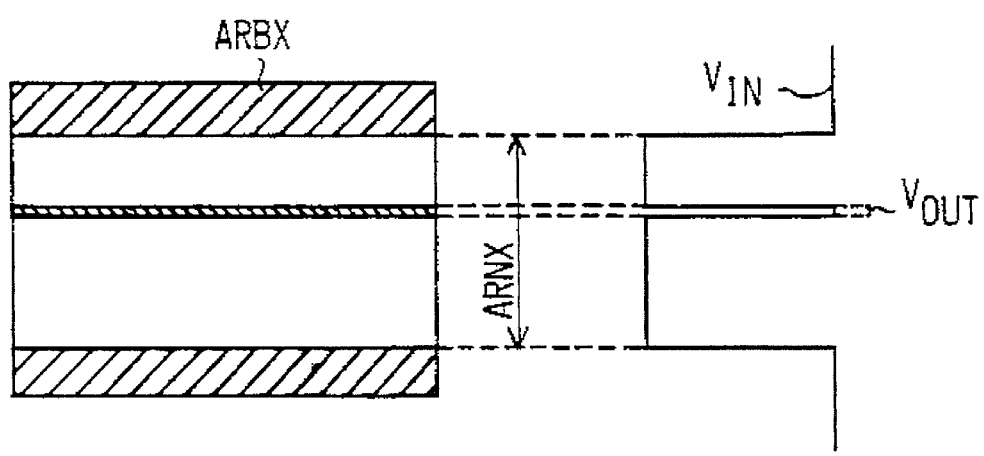
FIGS. 6A and 6B are a schematic depiction of a conventional aspect display and a signal waveform diagram serving for illustration the picture corresponding to an NTSC system in the second embodiment of the present invention.

When the average brightness level of the input video signal $V_{IN}$ is high and does not have much black signal, the black level hold circuit, because the area of the black signal (shown with oblique lines in the cinema size area ARNX in FIG. 6A) within the cinema size area ARNX is small compared to the area of the inputted video signal $V_{IN}$, does not hold the black signal portion as the darkest black signal level, and instead, holds the white level signal as the black level. Here, the black level expansion circuit 6, because the blanking pulse signal S4 is dropping, expands only the black signal portion of the video signal $V_{IN}$ within the cinema size area and thereby corrects the video signal so as to make it look more black.

As described above, according to the present invention, when an image is displayed in a first display screen having a first aspect ratio, the black level of a video signal is lowered to a predetermined level covering an overall display screen, thereby avoiding effectively a probability that a boundary of a second display screen and an extra area outward of the second display screen is sensed visually.

Further, when an image are displayed in the second display screen having a second aspect ratio, a black signal in a video signal is detected only within the second display screen, and the black signal is not detected in the extra screen, therefore a black level in the second display screen can be lowered to a predetermined level.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A display unit, comprising:

a first display screen area having a first aspect ratio;

a second display screen area having a second aspect ratio;

a black frame area partially bordering said second display screen area;

signal level expansion means for lowering a darkest signal level in an image of a display unit to a predetermined level when said image is displayed in said first display screen area;

signal level detecting means for detecting a darkest signal level of an image in said second display screen area when said image is displayed in said second display screen area, said signal level detecting means ignoring said black frame area when detecting a darkest signal level; and said signal level expansion means lowering a darkest signal level in an image of said display unit to a predetermined level when said image is displayed on said second display screen area based on a detected result of said signal level detecting means.

2. A display unit as claimed in claim 1, wherein said first aspect ratio is further defined by a 16 to 9 aspect ratio, and wherein said second aspect ratio is further defined by a 4 to 3 aspect ratio.

3. A display unit comprising:

a first display screen having a first aspect ratio;

a second display screen having a second aspect ratio;

a black frame area partially bordering said second display screen;

signal level detection means for detecting a darkest signal level of an image in said second display screen when said image is displayed in said second display screen; and signal level expansion means, electrically connected to said signal level detection means, for lowering said darkest signal level to a predetermined level based on a detected result of said signal level detection means.

4. A display unit as claimed in claim 3, wherein said first aspect ratio is further defined by a 16 to 9 aspect ratio, and wherein said second aspect ratio is further defined by a 4 to 3 aspect ratio.

5. A display unit as claimed in claim 3, further comprising variable time constant means for varying the pulse width of said darkest signal level detected by said signal level detection means, said variable pulse width means being electrically connected to said signal level detection means and to said signal level expansion means.

6. A method for lowering a black level in a display unit comprising the steps of:

setting a first black level in a first display screen having a first aspect ratio;

setting a second black level and a second display screen having a second aspect ratio;

detecting a darkest signal of a video signal from an image area corresponding to said second display screen, excepting a black frame region partially bordering said second display screen; and lowering said darkest signal to a predetermined level in an image area corresponding to said first display screen.

7. A method as claimed in claim 6, wherein said first aspect ratio is further defined by a 16 to 9 aspect ratio and wherein said second aspect ratio is further defined by a 4 to 3 aspect ratio.

8. A method as claimed in claim 6, further comprising the step of varying a pulse width of said darkest signal level.

* * * * *